Figure 1:
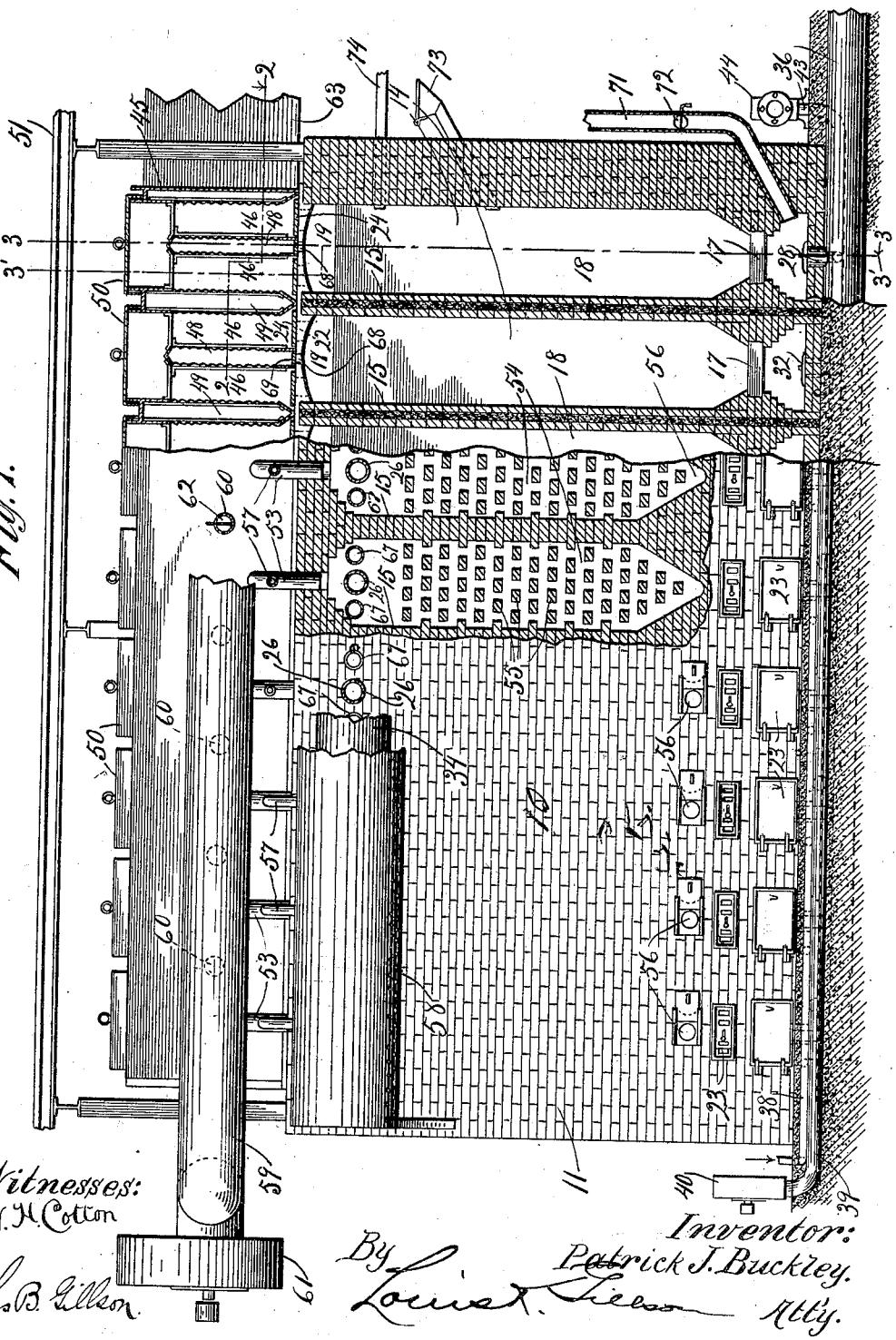

P. J. BUCKLEY.
METHOD OF MAKING GAS FROM PEAT.
APPLICATION FILED OCT. 14, 1905.

951,799.

Patented Mar. 15, 1910.

3 SHEETS—SHEET 1.

Witnesses:
W. H. Cotton
Chas. B. Gillson

Inventor:
Patrick J. Buckley.
By Louis T. Gibson
Atty.

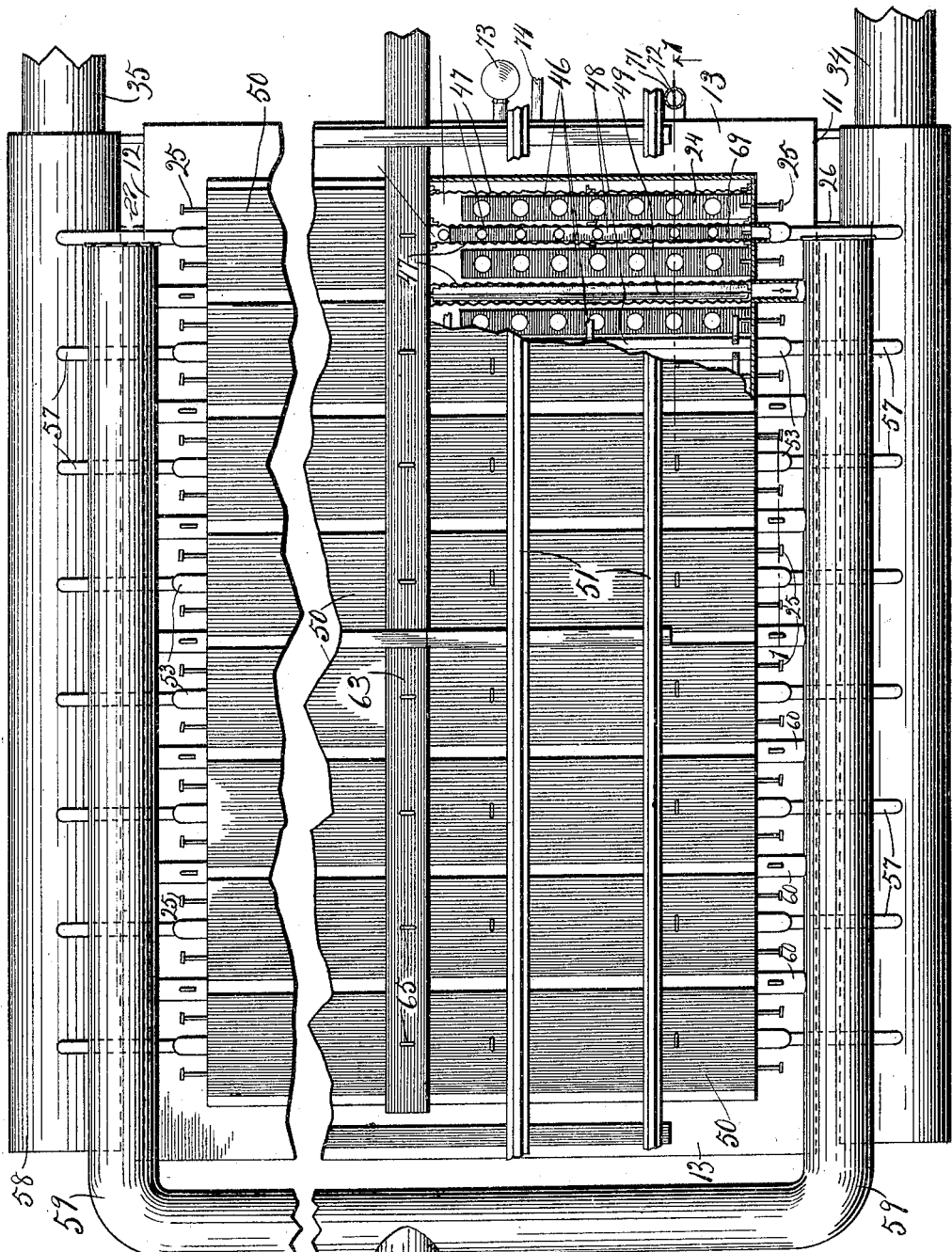

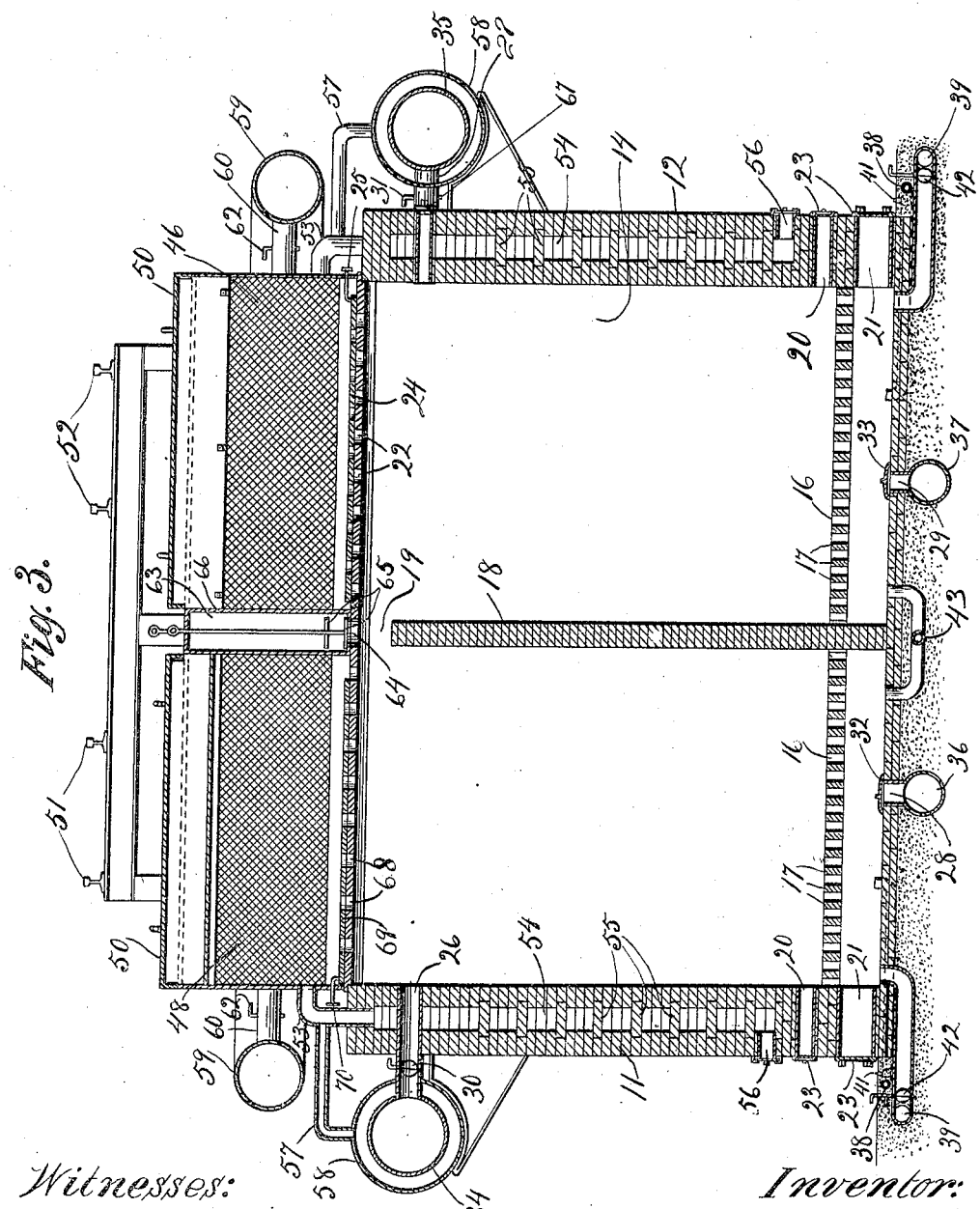

UNITED STATES PATENT OFFICE.

PATRICK J. BUCKLEY, OF WAUKESHA, WISCONSIN.

METHOD OF MAKING GAS FROM PEAT.

951,799.      Specification of Letters Patent.      Patented Mar. 15, 1910.

Application filed October 14, 1905. Serial No. 282,822.

*To all whom it may concern:*

Be it known that I, PATRICK J. BUCKLEY, a citizen of the United States, and resident of Waukesha, county of Waukesha, and State of Wisconsin, have invented certain new and useful Improvements in Methods of Making Gas from Peat, of which the following is a specification, and which are illustrated in the accompanying drawings, forming a part thereof.

The invention relates to an improved method of producing gas from peat, and has for its object to provide a process for obtaining from peat a gas sufficiently rich to be stored or transferred to advantage and capable of being put to any of the uses for which combustible gases are now employed.

Inasmuch as coke of commercial value cannot be made from peat, it is important, if gas is to be profitably made from this material, that substantially the whole of each of its combustible constituents be converted into gas by the process employed. In Letters Patent No. 763,460, issued to me June 28, 1904, there is shown a form of apparatus which may be employed in this way for obtaining producer gas from peat, but as is well known producer gas is a lean gas and can be generated and used to advantage only when it is to be used immediately after its generation and while it still retains a considerable amount of the sensible heat developed during its production and carries in suspension a quantity of tar and other combustible vapors which would in time separate out and be lost.

The invention contemplates the production of large quantities of gas by destructive distillation of the material and by the treatment of the heated residue from the distillation process, with steam, and a small amount of producer gas which will be formed as a portion of the material is necessarily burned for the purpose of maintaining the apparatus and its contents at a high temperature and which may be mixed with the other gases or immediately consumed in or about the apparatus.

A further detail of the invention contemplates the cleaning of ashes from the partially consumed particles of material, it having been found that as peat burns the ashes formed, being exceedingly fine and light, adhere to the particles and protect the burning interior from the action of the surrounding air or steam.

The invention consists in the various steps hereinafter pointed out and may be practiced in an apparatus such as that illustrated in the accompanying drawings, in which—

Figure 1 is a side elevation, appearing partly in section on the planes indicated by the line 1—1 of Fig. 2; Fig. 2 is a plan view partly in section; and Fig. 3 is a vertical cross section on the line 3—3 of Fig. 1.

The improved method of making gas from peat consists broadly in the destructive distillation of the material in a retort, for which peat is particularly well adapted, having a high percentage of volatile constituents; in the subsequent introduction of air for the production of producer gas and for the purpose of obtaining a hot bed of coals, and then in the introduction of steam for making water gas, and in further details of operation to be hereinafter described.

An apparatus for carrying the process into operation preferably consists in a covered structure 10. As shown in the drawings this is of masonry and is oblong rectangular in shape, having front and rear walls 11 and 12, respectively, and end walls 13. The interior of this structure is divided vertically into a plurality of juxtaposed retorts 14 by transverse partition walls 15, extending between the front and rear walls 11 and 12 for the entire height of the structure. The retorts 14 are each provided with a fire grate 16 near the bottom of the structure, and as the ashes of peat have no tendency to run together to form clinkers, these fire grates may be formed rigid and of brick or tile, as 17, supported in the partition walls. A longitudinal partition wall 18, extending the entire length of the structure, divides each of the retorts, preferably about midway of its length, as shown the partition wall 18 being of less height than the walls of the structure and the partitions 15, so that an opening 19 is provided at the top of each retort to permit the passage of gas from one end of the retort to the other.

In the front and rear walls 11 and 12 of the structure there are provided clean-out openings 20 for each of the retorts, and an opening 21 for the removal of ashes, and in the top of the structure there are openings 22 for the introduction of fuel. The openings 20 and 21 are each provided with closely fitting doors, such as are ordinarily used for closing gas retorts, and are indicated at 23, and the fuel openings 22 for each retort are adapted to be closed by a sliding plate 24 having openings adapted to be brought into register with the openings 22 and provided with an operating handle 25.

As shown each retort is provided with a plurality of gas outlets, as 26, 27, 28 and 29, the outlets 26 and 27 being preferably adjacent the top of the retort and at opposite ends thereof, and being employed for drawing off the gas generated by the distillation of the material and of the producer gas. The outlets 28 and 29 lead out of the spaces below the fire-grate 16 at either side of the partition wall 18, and are employed for drawing off the water gas. Each of the gas outlets is provided with a valve, as 30, 31, 32 and 33, so that all of the outlets for each individual retort may be controlled independently of the others. The corresponding outlets for all of the retorts lead to suitable mains 34, 35, 36 and 37, which preferably, though not necessarily, deliver to a common storage tank (not shown) from which the intermixed gases may be drawn for use as required.

Steam and air are supplied to the interior of the retort through pipes 38 and 39, respectively, delivering to the space below the grate bars 16 at each side of the partition walls 18, and the former leading from a suitable steam supply, not shown, and the latter from a blower which will preferably be of a variety capable of delivering a large amount of air at a low pressure and which is conventionally shown at 40. Each of the outlets for these pipes is provided with a valve adapted to be independently controlled, as at 41, 42. In addition to the air supply just mentioned there may be provided for each retort an additional air pipe 43, leading from an air compressor, conventionally indicated at 44, and adapted to deliver air to the retort at a high pressure.

Preferably there is associated with the structure some form of drying apparatus for the treatment of green peat preliminary to its introduction into the gas retorts. This drying apparatus is most conveniently mounted above the structure and comprises a plurality of bins 46, each having perforated side walls 47, which are most conveniently formed of material ordinarily known as expanded metal, suitable air spaces 48 and 49 being provided between the bins. As shown in the drawings two such bins are provided above each of the gas retorts, the cover plates 24, previously described, forming the bottom of the bins, so that their contents may be dumped through the openings 22 into the interior of the retort as required. Removable cover plates 50 are provided for the bins, preferably separate covers being employed for the bins over each retort, and suitable tracks, as 51 and 52, are supported above the bins for receiving cars to be used in filling them. The heated air for drying the material in the bins is supplied through a pipe 53 to each of the interspaces 48, from chambers 54 formed in the front and rear walls of the structure. These chambers are partially filled, as at 55, with open or checkered brick-work, to provide a greater extent of radiating surface for the heat derived from the walls of the structure, and an air opening 56 leads to the base of each chamber. This heated air is adapted to be drawn through the bins for drying the material by an exhaust fan which is conventionally shown at 61, the air passing out of the bins by way of the air spaces 49, and a pipe 59 leading to the fan and opening into each of the air spaces through a branch 60. Valves 62 are provided in each of the branch pipes 60 so that the bins for each retort may be independently operated, if desired. The supply of heated air, just described, may be supplemented by an additional supply introduced through a branch pipe 57, opening into the pipes 53 and leading from suitable jackets 58 surrounding the gas mains 34 and 35.

A smoke flue 63 extends longitudinally over the structure and leads preferably to a suitable chimney, not shown. This flue is shown as rectangular in cross section and as dividing the drier about midway of its width, thereby permitting the contents of the bins 46 to come in contact with its heated walls, as 66, and aiding in the drying operation. Each of the retorts communicates with the interior of this flue through an opening 64 adapted to be controlled from the top of the structure by means of a damper 65.

A set of doors 67 is provided in the walls 11 and 12 for each of the retorts, and are normally closed by covers which may be automatically opened by excessive pressure in the retorts to prevent damage to the structure by explosions. As shown, there are also a plurality of openings 68 from each retort into the corresponding air space 48 between the bins 46, which may be closed by an apertured plate 69, similar in construction to the plate 24 for closing the openings 22, and adapted to be operated by a suitable hand-piece 70.

The operation of this apparatus in carrying out the improved method for making gas from peat is as follows:—The drying bins 46 are filled with green peat from cars running on the tracks 51 and 52, the material being preferably supplied in the form of lumps which are sufficiently dry to maintain their form during the operation of charging the bins. The peat may be prepared in this way by any desired process of pressing and drying, but most conveniently by the use of a form of drying press forming the subject of Letters Patent for improvement in peat driers issued to me July 17, 1906. After the contents of the bins have been completely dried, as will be hereinafter more particularly pointed out, it will be dumped into the interior of the retorts by operating the sliding plates 24 from the hand-pieces 25, after which the bins will be immediately recharged. When a small fire has been kindled within the retort, preferably from the remains of the previous charge, air will be admitted by operating the valves 42, the sliding plates 69 being shifted to uncover the openings 68 so that the products of combustion may pass into the air spaces 48 and be drawn by the exhaust fan 61 through the contents of the bins 46, whereby they are quickly warmed and the subsequent drying operation more easily effected. As soon as the contents of the retort have been raised to a high temperature, the air supply will be shut off and the openings 68 closed, and the material within the retort allowed to distil, the outlet 26 being opened by operating the valve 30 to permit the escape of the gas generated into the gas main 34. The distillation of the material will be considerably aided by the conduction of heat through the partition walls 15 from the combustion of material in adjacent retorts. This operation will be carried on as long as found desirable, and may be stimulated from time to time by the introduction of air from the supply pipe 39. At such times the gas outlet 26 will be closed and the products of combustion permitted to escape either by way of the flue 63 to the chimney, or the gas outlet 27 by operating the proper valves. When the volatile constituents of the peat contained within the retort have been entirely driven off, the gas outlet 26 will be again closed and air introduced through the pipe 39 for the production of producer gas, which may be led away through the openings 27 and the gas main 35. Since, however, the gas so formed is of little value, this operation will be continued only as long as is necessary to obtain a hot fire within the retort, when the air supply will be shut off and steam admitted by operating the valve 41 for the production of water gas. This part of the operation will be most conveniently carried on as follows:— At the beginning, when there is a hot fire in the retort at both sides of the partition wall 18, as viewed in Fig. 3, steam will be introduced through each of the pipes 38 and the gas drawn off through main 34 by opening the valve 30 controlling the gas outlet 26. When, however, the fire becomes materially deadened the action will be stimulated by shutting off one of the sources of steam supply and the gas outlet 26, and by opening that one of the gas outlets 28, 29, leading to the mains 36, 37, which is on the side of the partition 18 from which the steam supply is shut off. The steam will then be required to intermingle with the contents of the retort at each side of the partition 18 before reaching the gas outlet, traveling up at one side of the partition, passing through the opening 19 and down through the fire at the opposite side, finally escaping in the form of water gas through one of the gas outlets 28, 29. This process will be reversed from time to time by shifting the corresponding valves and the fire may be further stimulated as may be required by the formation of producer gas for short intervals, as previously described; but aside from this the production of water gas will be continued until the contents of the retort have been practically consumed. During all of this operation the material in the bins has been subjected to the drying effect of a current of heated air from the wall chambers 54 and the jackets 58, and by the time the contents of the retort have been consumed will be sufficiently dry to be dumped into its interior through the openings 22 and the cycle of operations just described repeated.

It will be understood that the operation of each retort is an intermittent one, but preferably the several retorts will be so controlled that the supply of gas delivered through the mains 34, 36 and 37 will be substantially continuous and the walls 15 of a retort in which gas is being formed by the distillation process will be kept highly heated by the formation of producer and water gas in adjacent retorts.

If desired the tar which will be condensed from the gas formed by the distillation process in the ordinary way, may be converted into a fixed gas and utilized for enriching the gas already formed. This operation will preferably be carried on in one of the retorts 14. This tar will be thrown into the retort through a side opening, as 73, when the contents are in a highly heated condition. Steam will then be introduced preferably through a pipe 74 leading into the retort above the fire and drawn down through the heated mass, as in the operation of making water gas previously described. The combined action of the steam and incandescent carbon will decompose the tar forming permanent gases, which may be led away through the openings 28, 29, provided for carrying away the water gas, or through a separate outlet 71 leading out of the retort from the space below the fire grate 16 and provided with a controlling damper 72.

The fire may be cleaned from time to time, particularly just previous to and during the production of water gas, by the introduction of compressed air through the pipe 43 and by opening the damper 65 leading to the smoke flue 63. The blast of air being passed through the fire in this way will remove the crust or scale of ashes which forms about the burning particles of peat and a large part of the ash, being exceedingly fine and light, will be carried away through the smoke flue.

Obviously other material, for example, saw dust, certain grades of coal or lignite, may be employed for making gas by this improved method without departing from the invention.

The gaseous products which pass into the flue 63 may be collected and mixed with the other gases, if desired.

I claim as my invention—

1. The method of making gas from peat consisting in forcing air through a mass of the material in the presence of combustion, then heating the mass of material by radiation and conduction of heat without access of air to it and in then blowing steam through it, such operations to be practiced upon different charges of material in a plurality of contiguous but independent retorts, the several operations in each retort being so timed that heat generated in one retort may be utilized for carrying on the operation in an adjacent retort.

2. The method of making gas from peat consisting in forcing air through a mass of the material in the presence of combustion, then heating the mass of material by radiation and conduction of heat without access of air to it, and in then blowing steam through it alternately in opposite directions, such operations to be practiced upon different charges of material in a plurality of contiguous retorts, the several operations in each retort being so timed that heat generated in one retort may be utilized for carrying on the operation in an adjacent retort.

3. The method of making gas from peat consisting in forcing air through a mass of the material in the presence of combustion, then heating the mass of material by radiation and conduction of heat without access of air to it, then forcing air through the mass and in then blowing steam through it, such operations to be practiced upon different charges of material in a plurality of contiguous but independent retorts, the several operations in each retort being so timed that heat generated in one retort may be utilized for carrying on the operation in an adjacent retort.

PATRICK J. BUCKLEY.

Witnesses:
CHARLES B. GILLSON,
E. M. KLATCHER.